US009613271B2

(12) United States Patent
Basu et al.

(10) Patent No.: US 9,613,271 B2
(45) Date of Patent: Apr. 4, 2017

(54) DETERMINING SEVERITY OF A GEOMAGNETIC DISTURBANCE ON A POWER GRID USING SIMILARITY MEASURES

(71) Applicants: International Business Machines Corporation, Armonk, NY (US); Hydro-Quebec, Montreal, Quebec (CA)

(72) Inventors: Chumki Basu, Karnataka (IN); Jean Beland, Longueuil (CA); Sebastien Guillon, Beaconsfield (CA); Innocent Kamwa, Longueuil (CA)

(73) Assignees: International Business Machines Corporation, Armonk, NY (US); Hydro-Quebec, Montreal (CA)

( * ) Notice: Subject to any disclaimer, the term of this patent is extended or adjusted under 35 U.S.C. 154(b) by 91 days.

(21) Appl. No.: 14/836,191

(22) Filed: Aug. 26, 2015

(65) Prior Publication Data

US 2017/0061208 A1 Mar. 2, 2017

(51) Int. Cl.
*G06K 9/46* (2006.01)
*G06K 9/00* (2006.01)

(52) U.S. Cl.
CPC ..... *G06K 9/00523* (2013.01); *G06K 9/00536* (2013.01); *G06K 2209/27* (2013.01)

(58) Field of Classification Search
CPC ........... G06K 9/00523; G06K 9/00536; G06K 2209/27
See application file for complete search history.

(56) References Cited

U.S. PATENT DOCUMENTS

| 5,499,196 | A | * | 3/1996 | Pacheco | G08B 26/008 |
| | | | | | 702/81 |
| 6,023,223 | A | * | 2/2000 | Baxter, Jr. | G06Q 10/06 |
| | | | | | 340/3.4 |

(Continued)

OTHER PUBLICATIONS

Kappenman et al., Geomagnetic Storm Forecasting and Power System Risk Management. 2001 IEEE Power Engineering Society Winter Meeting.

(Continued)

*Primary Examiner* — Samir Ahmed
(74) *Attorney, Agent, or Firm* — Ryan, Mason & Lewis, LLP (57) ABSTRACT

Methods, systems, and computer program products for determining severity of a geomagnetic disturbance on a power grid using similarity measures are provided herein. A method includes extracting multiple features of activity associated with geomagnetically induced currents from multiple heterogeneous data streams; comparing the extracted features to historical data related to geomagnetically induced currents to determine a level of similarity between each of the extracted features and the historical data; assigning a level of severity to one or more of the extracted features having a level of similarity with the historical data above a given threshold; and generating a notification comprising (i) a prediction of activity associated with geomagnetically induced currents based on the extracted features having a level of similarity with the historical data above the given threshold, and (ii) the level of severity assigned thereto.

20 Claims, 3 Drawing Sheets

(56) References Cited

U.S. PATENT DOCUMENTS

| | | | | |
|---|---|---|---|---|
| 6,104,582 | A * | 8/2000 | Cannon | G06F 1/26 361/1 |
| 6,356,842 | B1 * | 3/2002 | Intriligator | G01W 1/10 702/3 |
| 6,581,008 | B2 * | 6/2003 | Intriligator | G01W 1/10 702/3 |
| 6,816,786 | B2 * | 11/2004 | Intriligator | G01W 1/10 702/3 |
| 7,096,121 | B2 | 8/2006 | Intriligator et al. | |
| 8,519,335 | B2 | 8/2013 | Fischbach et al. | |
| 2003/0065409 | A1 * | 4/2003 | Raeth | G05B 9/02 700/31 |
| 2005/0159894 | A1 * | 7/2005 | Intriligator | G01W 1/10 702/3 |
| 2009/0090869 | A1 * | 4/2009 | Fischbach | G01T 1/20 250/370.02 |

OTHER PUBLICATIONS

WG C4.32 Understanding of the Geomagnetic Storm Environment for High Voltage Power Grids, 2013. http://c4.cigre.org/WG-Area/WG-C4.32-Understanding-of-the-Geomagnetic-Storm-Environment-for-High-Voltage-Power-Grids.

Kamwa et al., "On the accuracy versus transparency trade-off of data-mining models for fast-response PMU-based catastrophe predictors", IEEE Transactions on Smart Grid, 3 (1), 152-161, Mar. 2012.

Kamwa et al., "Catastrophe predictors from ensemble decision-tree learning of wide-area severity indices", IEEE Transactions on Smart Grid, 1 (2), 144-158, Sep. 2010.

Kamwa et al., "Development of rule-based classifiers for rapid stability assessment of wide-area post-disturbance records", IEEE Transactions on Power Systems, 24 (1), 258-270, Feb. 2009.

Li et al., "The Similarity Metric", IEEE Transactions on Information Theory, vol. 50, No. 12, Dec. 2004.

Popivanov et al., "Similarity Search over Time Series Data Using Wavelets", Proceedings of the 18th International conference on Data Engineering, 2002.

Chua et al., "Unsupervised Learning of Patterns in Data Streams Using Compression and Edit Distance", IJCAI—2011.

* cited by examiner

DETERMINING SEVERITY OF A GEOMAGNETIC DISTURBANCE ON A POWER GRID USING SIMILARITY MEASURES

FIELD

The present application generally relates to information technology, and, more particularly, to power management technologies.

BACKGROUND

Geomagnetic disturbances (GMDs) pose a risk to a power grid because the resulting geomagnetically induced currents (GIC) can lead to significant disruptions in, or a complete collapse of, the grid in a short period of time. Depending on the severity of a GMD and the resultant GIC effects on the grid, specific corrective actions need to be taken to prevent damage to the grid. However, predicting the severity of a GIC event in real-time to detect and assign severity to GIC events presents numerous challenges.

SUMMARY

In one aspect of the present invention, measurement-based techniques for determining severity of a GIC event on a power grid caused by a geomagnetic disturbance on a power grid using similarity measures are provided. An exemplary computer-implemented method can include steps of extracting multiple features of activity (such as events) associated with geomagnetically induced currents from multiple heterogeneous data streams; comparing the multiple extracted features to historical data related to geomagnetically induced currents to determine a level of similarity between each of the multiple extracted features and one or more items of the historical data; assigning a level of severity to one or more of the extracted features (events) having a level of similarity with one or more items of the historical data above a given threshold; and generating a notification comprising (i) a prediction of activity associated with geomagnetically induced currents based on the one or more extracted features having a level of similarity with one or more items of the historical data above the given threshold, and (ii) the level of severity assigned to each of the one or more extracted features (events).

In another aspect of the invention a geomagnetically induced currents notification device can include a feature extractor component, executing on the geomagnetically induced currents notification device, to extract multiple features of activity (such as events) associated with geomagnetically induced currents from multiple heterogeneous data streams; and a feature selector and comparator component, coupled to the feature extractor component, and executing on the geomagnetically induced currents notification device, to: compare the multiple extracted features to historical data related to geomagnetically induced currents to determine a level of similarity between each of the multiple extracted features and one or more items of the historical data; assign a level of severity to one or more of the extracted features (events) having a level of similarity with one or more items of the historical data above a given threshold; and generate a notification comprising (i) a prediction of activity associated with geomagnetically induced currents based on the one or more extracted features having a level of similarity with one or more items of the historical data above the given threshold, and (ii) the level of severity assigned to each of the one or more extracted features (events). In such an aspect of the invention, the feature extractor component and the feature selector and comparator component are coupled to (i) a central processing node configured to capture data from multiple heterogeneous data sources, and (ii) a display for presentation of the notification to a user.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes determining severity of a GIC event on the power grid caused by a geomagnetic disturbance using dictionary-based and feature-based similarity measures. As also detailed herein, one or more features of activity associated with geomagnetic disturbances are described. In one example embodiment of the invention, a feature can be expressed as a logical condition. For instance, a feature that captures the rate of change of total magnetic field exceeding a given threshold can be referred to as "dB/dt>threshold."

Severity of a GIC event can be determined, for example, by comparing an event X to a case based on previous events that have been assigned severity levels (for example, moderate GIC event, severe GIC event, etc.). As used herein, a case refers to a multi-set that includes temporally and/or spatially ordered words and/or features. At least one embodiment of the invention includes generating and implementing a hybrid similarity metric that combines distance-based and feature-based measures. Additionally, as detailed herein, at least one embodiment of the invention includes generating and implementing a dictionary-based compression measure to compute the self-similarity of module (also referred to as magnitude) phases A, B, and C to detect a GIC event as well as to compute similarity of harmonics, K-indices, and geo-electric field data to determine severity of an event.

One or more embodiments of the invention include generating early warnings and summaries of the trajectory of a GIC event by utilizing data from multiple, heterogeneous sensors. Such data can include, for example, harmonics, phasor measurement unit (PMU) data, geomagnetic/geo-electric data, including derived indices, satellite data and space weather forecasts. Such data are analyzed to recognize and/or identify system events and key indicators and/or features of GIC activity, wherein the GIC events are predicted based on comparisons of the analyzed data with historical data to assign a severity level to a warning.

At least one embodiment of the invention includes extracting such features by segmenting data streams of heterogeneous data into words (and words into phrases) based on different detected events, wherein a dictionary-based similarity (compression) measure is used on extracted features to determine regularities across data streams. Additionally, a module phase-to-phase similarity measure is used as a key indicator for GIC activity, and filters are used in a sort-merge algorithm that are based on dimensions such as synchronicity in behaviors of sensors and a trajectory of the GIC event. Accordingly, such an embodiment includes generating (early) warnings for the GIC by triggering the sort-merge algorithm based on detection of at least one key indicator in the data streams, and by implementing normalized compression distance measures to compute similarity of a multi-set of features to past/historical cases.

As further described herein, at least one embodiment of the invention includes implementing distance-based similarity metrics and feature-based similarity metrics. Implementing distance-based similarity metrics can include pattern-matching against sequences of K-indices, geo-electric field data, module phase A, B and C, and/or harmonics. For example, a dictionary-based compression technique (such as, for instance, the Lempel-Ziv-Welch (LZW) compression algorithm) can be applied to both discrete data as well as continuous data to compress text and images as well as voltage signals in electrocardiograms. Implementing feature-based similarity metrics can include, for example, limiting, if a zone or region is important, the similarity comparisons to PMUs in the same zone. Also, for example, if severity is important, then the comparisons can be limited to those cases that have the same severity level.

As also further described herein, at least one embodiment of the invention includes computing self-similarity of feature pairs and similarity of pairs across cases. In computing self-similarity of feature pairs, for example, phase-to-phase similarity can be a unique identifier of GIC events. Also, computing similarity of pairs across cases can include computing a dictionary-based similarity metric for each pair of features (harmonics, K-indices, geo-electric field, etc.) across cases.

One or more embodiments of the invention include generating an event language representation that is independent of the source data stream. For example, using a common event language to describe geomagnetic data measured by magnetometers as well as harmonics data measured by synchrophasors facilitates similarity comparisons between words (events) using metrics such as normalized compression distance (NCD) and cosine similarity. Such an embodiment of the invention includes defining a vocabulary of features or words. As used in this context, a word is a basic unit of information which is a sequence of data samples representing an event as well as its associated pre-event and post-event periods. A sample event corresponds to a key indicator, that is, a given percentage of the data samples exceeding some limit violation threshold. The corresponding word includes data samples in the window of time immediately preceding the time when the limit violation threshold is exceeded (referred to herein as the pre-event period), the event itself, and some period of time after the last observed limit violation (which is referred to herein as the post-event period).

Alternatively, a word can be a subsequence of a data stream delimited from left to right by a start and end time, respectively. Additionally, words can be concatenated to form phrases that represent temporal event sequences. In addition, once the start and end times of an event are determined from any given data stream, the times can also be used to delimit words from related data streams. For example, the start and end times of an event in the voltage harmonics data stream can be used to delimit words in the Module Phase A, Phase B, and Phase C streams, or in the geomagnetic data stream to enforce time synchronization across the sources.

Also, a typical GMD can be broken down into phases including a period of one to a few hours when the horizontal component of the Earth's magnetic field is severely depressed followed by a period of recovery, which may last several days. One or more embodiments of the invention pertains not only to GMD onset detection, but also to severity analysis and trajectory tracking of a resultant GIC event. Specifically, for GIC event trajectory tracking, at least one embodiment of the invention includes implementing a data-driven method that infers directionality for a given time window. By repeating this process across multiple time windows, the trajectory of the storm or event can be tracked. Additionally, such information can also be used to automatically generate a summary of the entire GIC event over a period of time.

Figure 1:
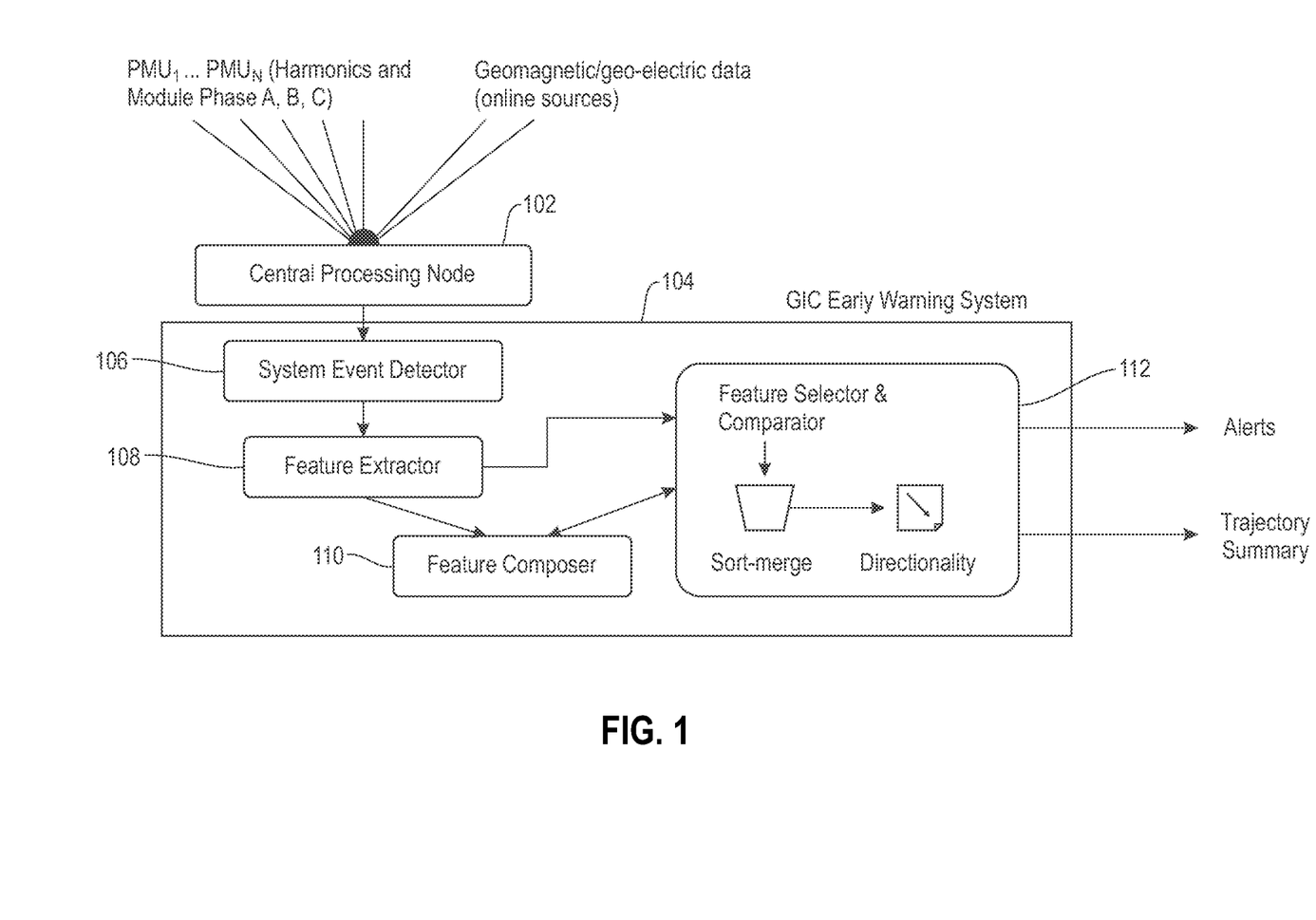
FIG. 1 is a diagram illustrating system architecture, according to an example embodiment of the invention.

FIG. 1 is a diagram illustrating system architecture, according to an embodiment of the invention. By way of illustration, FIG. 1 depicts a central processing node 102 and a GIC early warning system 104. The GIC early warning system 104 includes a system event detector component 106, a feature extractor component 108, a feature composer component 110 and a feature selector and comparator component 112. As depicted in FIG. 1, the central processing node 102 receives and processes various input data, and subsequently provides data to the GIC early warning system 104, specifically to the system event detector component 106. As further detailed herein, the system event detector component 106 provides data to the feature extractor component 108, which provides data to both the feature composer component 110 and the feature selector and comparator component 112. The feature composer component 110 and the feature selector and comparator component 112 additionally interact with one another. Further, the feature selector and comparator component 112 outputs one or more alerts and a trajectory summary, as further described herein.

As detailed herein, the central processing node 102 combines data from multiple sources in real-time to enable prediction and/or detection of a GIC event (via component 106) and assign severity. As depicted in FIG. 1, such data sources can include geomagnetic data (geo-electric field) streams (for example, from online data sources), module phase A, B, and C data from PMUs, and harmonics data streams from PMUs. As further described herein, an embodiment such as depicted in FIG. 1 can include segmenting each data stream into events and mapping those events to features (also referred to herein as feature extraction). Also, multiple operations can be performed on the features, such as feature selection, composition, and/or comparison.

As noted, feature extraction (carried out via component 108 in FIG. 1) includes segmenting data streams into words based on detected events in the stream. In one or more embodiments of the invention, limit violation threshold-based event detection algorithms segment continuous streams of data into smaller chunks of data. As noted herein, a "word" can include a continuous record of measured data delimited by the start time and end time of an observed event. An event is detected in a given data stream when the percentage of data samples observed in a sliding window of the stream exceeds some limit violation threshold. In one or more embodiments of the invention, limit violation thresholds can be specific to the data source.

In an example embodiment of the invention, a feature is defined to be a word, and a composite feature is defined to be the result of some operator applied to two or more features (for example, C=Similarity(A, B) or C=Union(A, B)). Also, in such an embodiment, a phrase is defined to be a combination of words based on their relative position, such as, for example, "a K-index event followed by another K-index event."

In presenting measurement-based techniques for predicting GIC events, at least one embodiment of the invention includes combining multiple heterogeneous data streams to compensate for gaps and/or insufficiencies (such as, for example, in terms of spatial and temporal resolution) present in a single data stream. Such an embodiment can include combining multiple data sources by combining features. Such composite features are referred to herein as "complex features."

Composite features allow the combination of data from individual data streams in an expressive way. For example, consider a scenario wherein two features are combined using the logical connective, AND (and similarly, for the case of OR), to form the following complex feature: (dB/dt>threshold-1) AND (E-mag [electric field magnitude] >threshold-2). In addition to the logical connectives (AND, OR), complex features can be formulated using concatenation—the temporal sequencing of features. The latter is significant, for example, when it is expected that there is to be a sequential ordering in the events detected by measurements in the heterogeneous data streams. As an example, one embodiment of the invention can include detecting extreme activity in a satellite data stream (for instance, from atmospheric chemistry experiment (ACE) measurements), referred to as feature-1, before significant activity is detected in a magnetometer station on Earth by feature-2. In this case, the sequencing primitive, "followed by," checks for the combination of the two key features wherein one occurs before another. It is also possible, in one or more embodiments of the invention, to combine logical connectives and sequencing primitives, and to qualify a feature both spatially and temporally (for instance, feature-1 at location-A followed by feature-2 at location-B within time-C). Additionally, at least one embodiment of the invention can include formulating a complex feature by taking a linear combination of two individual features such as, for example, A*feature-1+B*feature-2.

To assign a classification score, c1, to a feature, f, at least one embodiment of the invention includes associating a measure based on the performance of the feature at performing a classification task (that is, classifying whether an event X is a GIC event). In one or more example embodiments of the invention, the relationship between some feature, f, and the event X using if-then rules can be expressed as follows: "If (f>threshold), then predict(X is a GIC event)." An appropriate measure can be the feature's missed alarm rate (at classifying alarms), false alarm rate, precision, recall, etc. This measure is evaluated on a test dataset. The choice of a measure depends on the operational conditions observed, for example, in the control room. The score, s, may also be a combined measure (for instance, of precision and recall) referred to herein as the F-score. It is also possible to estimate a correlation score, c2, for a feature based on how well the feature correlates with GIC events. C2 can be a function of a number of parameters such as, for example, classification score and average time delay (wherein time delay is defined as the time between the time of the onset of the activity captured by the feature and the end time of the event, X).

Additionally, at least one embodiment of the invention includes measuring the utility of the vocabulary of features using dictionary-based similarity, such as a compression distance to find regularities. It is expected that an increase in the number of features of a specific data type will occur before significant GIC activity, and such features are referred to herein as key indicators for GIC in a given data stream. For example, module phase-to-phase similarity is a unique indicator of GIC. Another feature can include, for example, a K-index above a certain level. In one or more embodiments of the invention, these features are the outputs of feature extractor component 108, as depicted in FIG. 1.

Referring back to FIG. 1, the central processing node 102 checks for the logical combination of such key indicators (satisfying a criterion, for example, that at least one indicator is observed). Note that in one or more embodiments of the invention, it is not enough for a feature to represent only the time instant when similarity is max or some measurement exceeds a threshold; in such an embodiment, a feature captures all three time periods: pre-event, event, and post-event time.

In at least one embodiment of the invention, it is expected that patterns or overlap will occur in the features observed for each of the key indicator types in the period from the start time of the event until the end time. Referring to FIG. 1, the feature selector and comparator component 112 applies a fuzzy matching approach (a distance-based similarity) to find overlap in words both for a given type and across types. To compute the similarity of words, at least one embodiment of the invention includes implementing a compression-based similarity metric such as, for example, NCD. As such, in an example embodiment of the invention, for two binary sequences, x and y, C(x) is the compressed size of x, C(y) is the compressed size of y, and C(xy) is the compressed size of x concatenated with y:

$$NCD(x, y) = \frac{C(xy) - \min\{C(x), C(y)\}}{\max\{C(x), C(y)\}}.$$

With such a formulation, smaller numbers represent more similar sequences.

For self-similarity, at least one embodiment of the invention includes computing:

$$\text{sim}(P_A, P_B) = \text{NCD}(P_A, P_B).$$

Further, such an embodiment can also include computing the similarity between two cases, A and B, by computing what is referred to as the normalized compression distance between multi-sets (as opposed to a pair of sequences), also referred to herein as $NCD_m$. Using $NCD_m$, at least one embodiment of the invention includes computing a similarity score for a new event sequence, X with respect to two multi-sets or cases, A and B, according to the following rule (as described, for example, in Cohen et al., "Normalized Compression Distance of Multisets with Applications", *IEEE Transactions on Pattern Analysis & Machine Intelligence*, no. 1, pp. 1, November 2014.):

If $(NCD_m(AX)-NCD_m(A)<NCD_m(BX)-NCD_m(B))$

Then (X is more similar to A) Else (X is more similar to B).

Feature selection and/or dimensionality reduction can include utilization of techniques such as sort-merge, principal component analysis (PCA), etc. The feature selector and comparator component 112 exploits redundancy in grid data to reduce the number of features or words. At least one embodiment of the invention also includes temporally filtering events. In such an embodiment, the central processing node 102 can define different kinds of filters using a sort-merge method. For example, the central processing node 102 can group a subset of PMUs known to respond synchronously during a GIC event, or the central processing node 102 can group PMUs located along the trajectory of the geomagnetic storm (utilizing a directionality component).

Accordingly, in at least one embodiment of the invention, the feature selector and comparator component 112 invokes a generalized sort-merge operation. By way of example, a sort-merge operation can be applied to sensor data collected at the central processing node 102. Words can be sorted temporally and an "ability to merge" words across one of n dimensions defined by the feature space can be computed. Because, in one or more embodiments of the invention, exact matches of words cannot always be expected, if an NCD score is less than some pre-defined limit, then two words are very similar and could be merged (that is, one word replaced by the other word, and vice versa). Additionally, such an embodiment can also include determining if the compression distance between observed data is sufficiently small.

Utilizing a representation of features (also referred to herein as a vocabulary), at least one embodiment of the invention can include building on this vocabulary to define a procedure to generate temporal and spatial summaries of a storm (or event). Such a procedure can include sorting events (words) temporally (the first stage of sort-merge), and setting a flag if a key indicator is observed. If a flag is set, the union of all observed events in a predefined time window can be obtained and added to a bag of words or a multi-set representation (the merge step). Each multi-set represents a paragraph.

Additionally, a nested sort-merge operation can be applied to each multi-set such that words in each multi-set are sorted by type and by location, and, for each type, an NCD score is computed for words of the corresponding types, each of which represents an "ability to merge" score. For each location, all temporally ordered words, $w_t$, can be concatenated to form a phrase, p, such that length(p)<n. Within a temporal phrase, words that are of the same type can be merged. As used herein, merging includes compressing and/or replacing multiple words of the same type via a single representative word.

Such an embodiment of the invention can also include using (i) synchronicity in the behaviors of synchrophasors and (ii) spatial of coordinates of synchrophasors to track the trajectory of a storm. As used herein, synchrophasors (or phasor measurement units) are a type of high-throughput, low latency grid sensor that measures voltage magnitude, phase angle and frequency. For each time window, all spatially ordered words, $w_s$, can be concatenated from north to south and from west to east. Within a spatial phrase, words that are of the same type can be merged. By inferring the directionality across multiple time windows, at least one embodiment of the invention can include enabling tracking the trajectory of the given storm.

Also, in at least one embodiment of the invention, a similarity score for a case is computed as the average of the best-match NCD scores for all words in the given multi-set. Cases can then also be ranked by similarity score (highest to lowest). Further, if there is significant overlap with one or more past cases, a notification or early warning alert can be issued for GIC. The notification or early warning alert can also be assigned a severity based on the severity of the top-ranking case.

Figure 2:
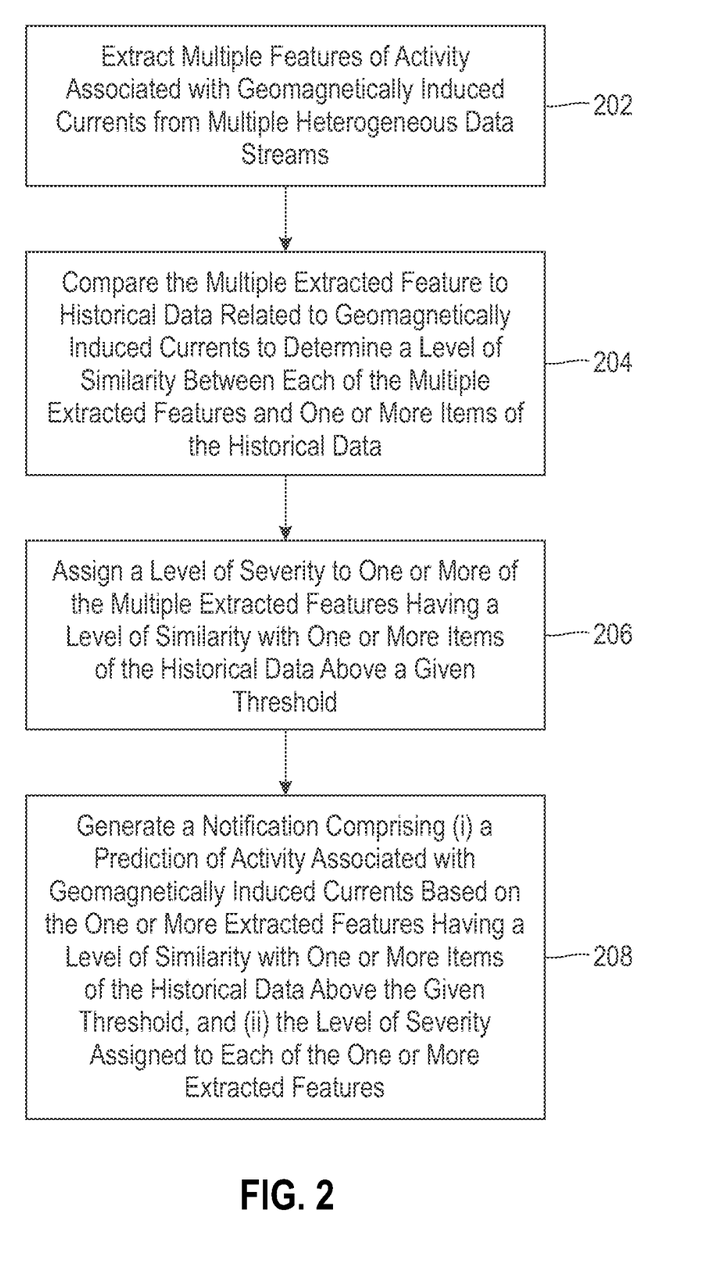
FIG. 2 is a flow diagram illustrating techniques according to an embodiment of the invention.

FIG. 2 is a flow diagram illustrating techniques according to an embodiment of the present invention. Step 202 includes extracting multiple features of activity (such as events) associated with geomagnetically induced currents from multiple heterogeneous data streams, wherein said extracting is executed by a feature extractor component of a geomagnetically induced currents notification computing device. Extracting can include segmenting the multiple heterogeneous data streams into multiple words based on multiple detected events of different types, and identifying one or more words as a feature based on a comparison of the segmented words to a pre-determined collection of words. At least one embodiment of the invention includes defining a feature to be a word, wherein a word is a continuous record of measured data delimited by the start time and end time of an observed event. Additionally, at least one embodiment of the invention includes defining a complex feature to be some operator applied to two or more features. Also, the multiple heterogeneous data streams can include data streams derived from harmonics, phasor measurement unit data, geomagnetic/geo-electric data, satellite data and/or space weather forecasts.

Extracting can also include computing self-similarity of module phase A, phase B, and phase C across the multiple heterogeneous data streams, as well as detecting a feature of activity uniquely associated with geomagnetically induced currents by noting when the self-similarity exceeds a given threshold. At least one embodiment of the invention can also include extracting a feature by applying a threshold to a data stream of magnetic indices (for example, K-index).

At least one embodiment of the invention can additionally include implementing a dictionary-based similarity measure on the multiple extracted features to determine one or more regularities across the multiple heterogeneous data streams.

Step 204 includes comparing the multiple extracted features to historical data related to geomagnetically induced currents to determine a level of similarity between each of the multiple extracted features and one or more items of the historical data, wherein said comparing is executed by a feature selector and comparator component of the geomagnetically induced currents notification computing device. Comparing can include applying one or more filters to the multiple extracted features in connection with a sort-merge algorithm. The one or more filters can be based on synchronicity in behavior of sensors associated with the multiple heterogeneous data streams, and can also be based on a trajectory of a given geomagnetic disturbance. Comparing can also include implementing one or more normalized compression distance measures to compute similarity of a multi-set of the multiple extracted features to the historical data.

Step 206 includes assigning a level of severity to one or more of the multiple extracted features (events) having a level of similarity with one or more items of the historical data above a given threshold, wherein said assigning is executed by the feature selector and comparator component of the geomagnetically induced currents notification computing device. Assigning can include computing a pairwise similarity between the one or more extracted features and the one or more items of historical data, and ranking the one or more items of historical data for each of the one or more extracted features according to the corresponding computed pairwise similarity. One or more embodiments of the invention also include computing an average of the top N ranked items of the one or more items of historical data for each of the one or more extracted features, wherein N is a predetermined value, and assigning the average as the level of severity for each of the one or more extracted features.

Step 208 includes generating a notification comprising (i) a prediction of activity associated with geomagnetically induced currents based on the one or more extracted features having a level of similarity with one or more items of the historical data above the given threshold, and (ii) the level of severity assigned to each of the one or more extracted features (events), wherein said generating is executed by the feature selector and comparator component of the geomagnetically induced currents notification computing device.

As also detailed herein, at least one embodiment of the invention includes a geomagnetically induced currents notification device that can include a feature extractor component, executing on the geomagnetically induced currents notification device, to extract multiple features of activity (such as events) associated with geomagnetically induced currents from multiple heterogeneous data streams; and a feature selector and comparator component, coupled to the feature extractor component, and executing on the geomagnetically induced currents notification device, to carry out multiple actions. Such actions include comparing the multiple extracted features to historical data related to geomagnetically induced currents to determine a level of similarity between each of the multiple extracted features and one or more items of the historical data, and assigning a level of severity to one or more of the extracted features (events) having a level of similarity with one or more items of the historical data above a given threshold. Further, such actions also include generating a notification comprising (i) a prediction of activity associated with geomagnetically induced currents based on the one or more extracted features having a level of similarity with one or more items of the historical data above the given threshold, and (ii) the level of severity assigned to the one or more extracted features (events). In such an embodiment of the invention, the feature extractor component and the feature selector and comparator component are coupled to (i) a central processing node configured to capture data from multiple heterogeneous data sources, and (ii) a display for presentation of the notification to a user.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 3:
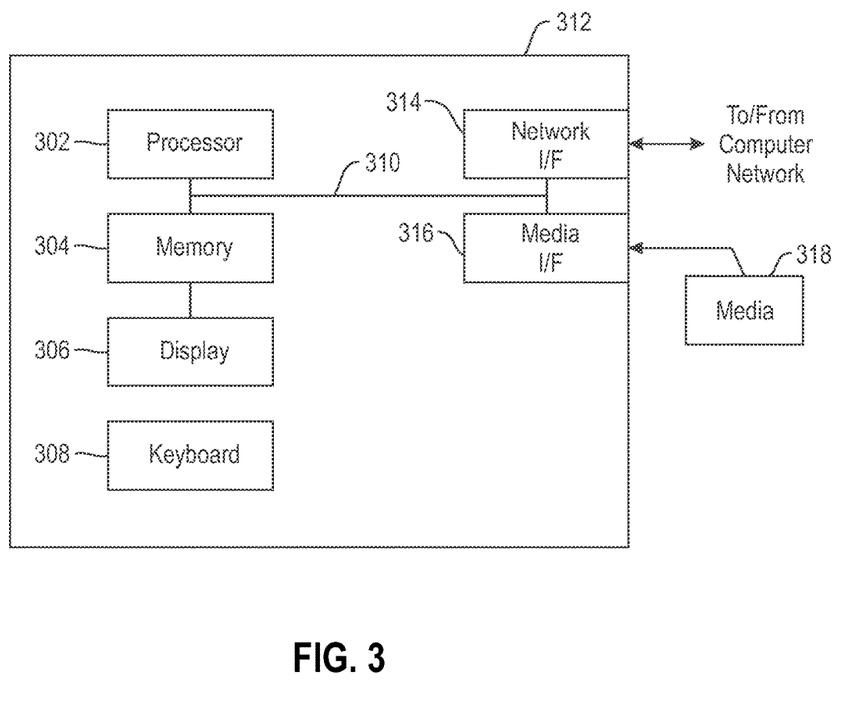
FIG. 3 is a system diagram of an exemplary computer system on which at least one embodiment of the invention can be implemented.

Additionally, an aspect of the present invention can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, forecasting a GIC event and the severity thereof in real-time.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   extracting multiple features of activity associated with geomagnetically induced currents from multiple heterogeneous data streams, wherein said extracting is executed by a feature extractor component of a computing device;
   comparing the multiple extracted features to historical data related to geomagnetically induced currents to determine a level of similarity between each of the multiple extracted features and one or more items of the historical data, wherein said comparing is executed by the computing device;
   assigning a level of severity to one or more of the multiple extracted features having a level of similarity with one or more items of the historical data above a given threshold, wherein said assigning is executed by the computing device; and
   generating a notification comprising (i) a prediction of activity associated with geomagnetically induced currents based on the one or more extracted features having a level of similarity with one or more items of the historical data above the given threshold, and (ii) the level of severity assigned to each of the one or more extracted features, wherein said generating is executed by the computing device.

2. The method of claim 1, wherein said extracting comprises:
   segmenting the multiple heterogeneous data streams into multiple words based on multiple detected events of different types; and
   identifying one or more of the words as a feature based on a comparison of the segmented words to a pre-determined collection of words.

3. The method of claim 1, comprising:
   implementing a dictionary-based similarity measure on the multiple extracted features to determine one or more regularities across the multiple heterogeneous data streams.

4. The method of claim 1, wherein the multiple heterogeneous data streams comprise data streams derived from harmonics, phasor measurement unit data, geomagnetic/geo-electric data, satellite data and/or space weather forecasts.

5. The method of claim 1, wherein said extracting comprises:
   computing self-similarity of module phase A, phase B, and phase C across the multiple heterogeneous data streams.

6. The method of claim 5, comprising:
   detecting a feature of activity uniquely associated with geomagnetically induced currents by noting when the self-similarity exceeds a given threshold.

7. The method of claim 1, wherein said comparing comprises applying one or more filters to the multiple extracted features in connection with a sort-merge algorithm.

8. The method of claim 7, wherein the one or more filters are based on synchronicity in behavior of sensors associated with the multiple heterogeneous data streams.

9. The method of claim 7, wherein the one or more filters are based on a trajectory of a given geomagnetic disturbance.

10. The method of claim 1, wherein said comparing comprises implementing one or more normalized compression distance measures to compute similarity of a multi-set of the multiple extracted features to the historical data.

11. The method of claim 1, wherein said assigning comprises computing a pairwise similarity between the one or more extracted features and the one or more items of historical data.

12. The method of claim 11, comprising:
ranking the one or more items of historical data for each of the one or more extracted features according to the corresponding computed pairwise similarity.

13. The method of claim 12, comprising:
computing an average of the top N ranked items of the one or more items of historical data for each of the one or more extracted features, wherein N is a pre-determined value; and
assigning the average as the level of severity for each of the one or more extracted features.

14. A computer program product, the computer program product comprising a computer readable storage medium having program instructions embodied therewith, the program instructions executable by a computing device to cause the computing device to:
extract multiple features of activity associated with geomagnetically induced currents from multiple heterogeneous data streams;
compare the multiple extracted features to historical data related to geomagnetically induced currents to determine a level of similarity between each of the multiple extracted features and one or more items of the historical data;
assign a level of severity to one or more of the multiple extracted features having a level of similarity with one or more items of the historical data above a given threshold; and
generate a notification comprising (i) a prediction of activity associated with geomagnetically induced currents based on the one or more extracted features having a level of similarity with one or more items of the historical data above the given threshold, and (ii) the level of severity assigned to each of the one or more extracted features.

15. The computer program product of claim 14, wherein the multiple heterogeneous data streams comprise data streams derived from harmonics, phasor measurement unit data, geomagnetic/geo-electric data, satellite data and/or space weather forecasts.

16. The computer program product of claim 14, wherein said assigning comprises:
computing a pairwise similarity between the one or more extracted features and the one or more items of historical data;
ranking the one or more items of historical data for each of the one or more extracted features according to the corresponding computed pairwise similarity;
computing an average of the top N ranked items of the one or more items of historical data for each of the one or more extracted features, wherein N is a pre-determined value; and
assigning the average as the level of severity for each of the one or more extracted features.

17. The computer program product of claim 14, wherein the program instructions executable by the computing device further cause the computing device to:
segment the multiple heterogeneous data streams into multiple words based on multiple detected events of different types; and
identify one or more words as a feature based on a comparison of the segmented words to a pre-determined collection of words.

18. The computer program product of claim 14, wherein the program instructions executable by the computing device further cause the computing device to:
implement a dictionary-based similarity measure on the multiple extracted features to determine one or more regularities across the multiple heterogeneous data streams.

19. A system comprising:
a memory; and
at least one processor coupled to the memory and configured for:
extracting multiple features of activity associated with geomagnetically induced currents from multiple heterogeneous data streams;
comparing the multiple extracted features to historical data related to geomagnetically induced currents to determine a level of similarity between each of the multiple extracted features and one or more items of the historical data;
assigning a level of severity to one or more of the multiple extracted features having a level of similarity with one or more items of the historical data above a given threshold; and
generating a notification comprising (i) a prediction of activity associated with geomagnetically induced currents based on the one or more extracted features having a level of similarity with one or more items of the historical data above the given threshold, and (ii) the level of severity assigned to each of the one or more extracted features.

20. A geomagnetically induced currents notification device comprising:
a feature extractor component, executing on the geomagnetically induced currents notification device, to extract multiple features of activity associated with geomagnetically induced currents from multiple heterogeneous data streams; and
a feature selector and comparator component, coupled to the feature extractor component, and executing on the geomagnetically induced currents notification device, to:
compare the multiple extracted features to historical data related to geomagnetically induced currents to determine a level of similarity between each of the multiple extracted features and one or more items of the historical data;
assign a level of severity to one or more of the multiple extracted features having a level of similarity with one or more items of the historical data above a given threshold; and
generate a notification comprising (i) a prediction of activity associated with geomagnetically induced currents based on the one or more extracted features having a level of similarity with one or more items of the historical data above the given threshold, and (ii) the level of severity assigned to each of the one or more extracted features;

wherein the feature extractor component and the feature selector and comparator component are coupled to (i) a central processing node configured to capture data from multiple heterogeneous data sources, and (ii) a display for presentation of the notification to a user.

* * * * *